United States Patent [19]
Frei et al.

[11] 3,951,045
[45] Apr. 20, 1976

[54] POWER ASSISTED RACK AND PINION STEERING GEAR

[75] Inventors: William R. Frei; Ernest M. Plant, II, both of Frankenmuth, Mich.

[73] Assignee: General Motors Corporation, Detroit, Mich.

[22] Filed: Sept. 9, 1974

[21] Appl. No.: 504,139

[52] U.S. Cl. .................. 91/467; 74/498; 92/108; 92/109; 92/136; 180/155
[51] Int. Cl.² .......... B62D 5/10; F15B 11/08; F15B 13/04
[58] Field of Search .......... 92/107, 108, 109, 136; 91/467; 74/500, 498; 180/79.2 F

[56] References Cited
UNITED STATES PATENTS

| | | | |
|---|---|---|---|
| 1,612,226 | 12/1926 | Sheldon | 92/108 X |
| 1,627,539 | 5/1927 | Halleck | 92/108 X |
| 2,847,078 | 8/1958 | Muller | 180/79.2 R |
| 3,103,986 | 9/1963 | Barton et al. | 180/79.2 F |
| 3,554,048 | 1/1971 | Adams | 74/498 |
| 3,646,852 | 3/1972 | Shields | 91/467 |

FOREIGN PATENTS OR APPLICATIONS

| | | | |
|---|---|---|---|
| 979,377 | 1/1965 | United Kingdom | 180/79.2 F |

*Primary Examiner*—Irwin C. Cohen
*Attorney, Agent, or Firm*—Charles R. White

[57] ABSTRACT

A compact rack and pinion steering gear having a hydraulically operated power cylinder concentric with respect to an internal cylindrical tube slidably supporting a pinion driven rack. The piston of the power cylinder is slidably mounted in the power cylinder and on the internal tube so that the teeth of the rack can pass through the plane of fluid sealing means adjacent to one end of the power unit to provide for a shortened rack length. The power cylinder is actuated by fluid pressure and is operatively connected to a rotary valve by one external line and by an internal passage in the valve housing. Protective flexible boot seals are provided at each end of the assembly which are pneumatically interconnected by an internal passage formed by existing structure in the assembly.

3 Claims, 3 Drawing Figures

U.S. Patent  April 20, 1976  3,951,045
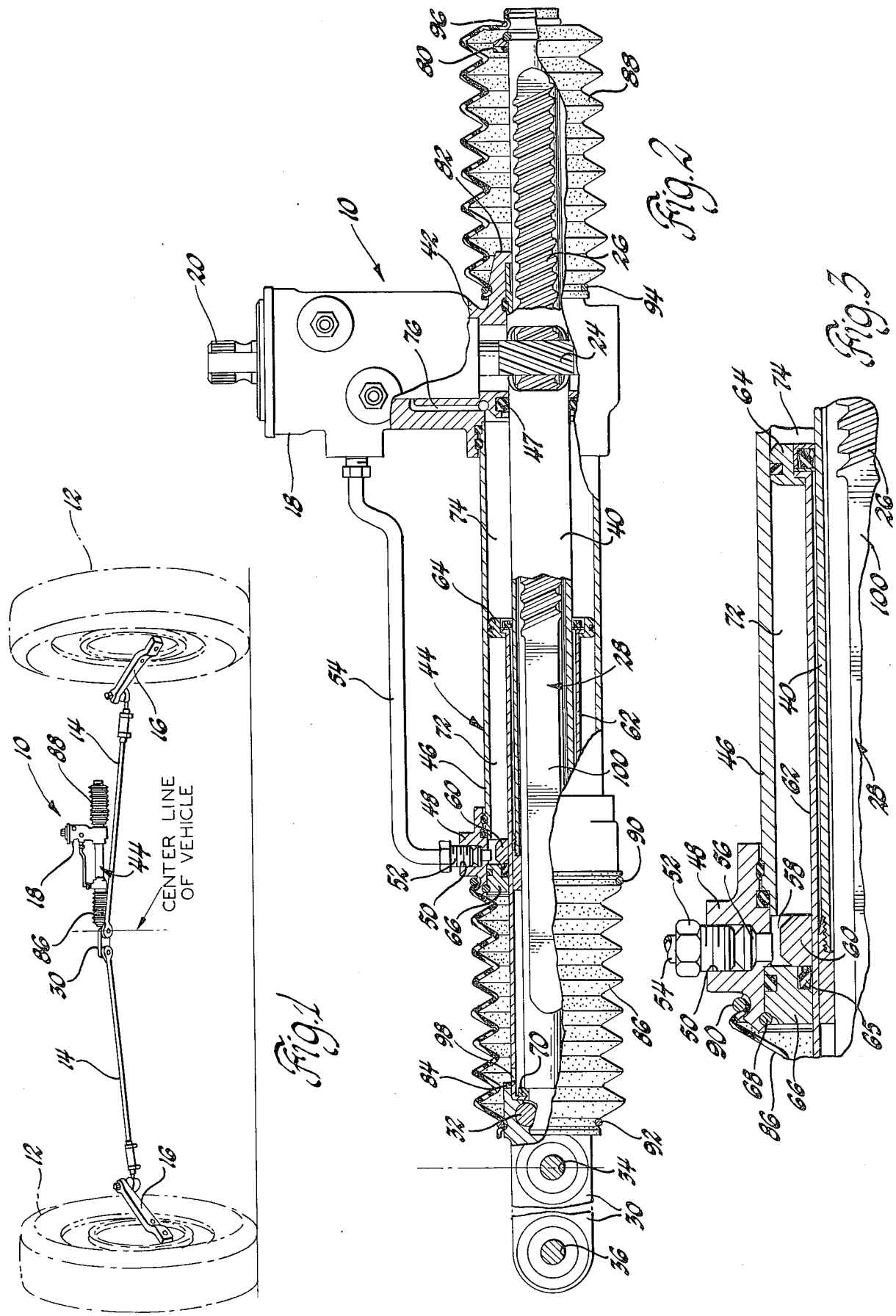

POWER ASSISTED RACK AND PINION STEERING GEAR

This invention relates to vehicle steering and more particularly to a new and improved power assisted rack and pinion steering gear assembly for vehicles.

To reduce vehicle operator steering effort prior rack and pinion steering gear assemblies have been devised with hydraulic power cylinders to provide power assistance for the pinion drive of the rack to turn the dirigible wheels of a vehicle. In one prior arrangement the power cylinder is formed as a lateral extension integral with the rack housing. The power cylinder has a piston mounted therein which is drivingly connected to the end of the rack by an elongated piston rod. The piston divides the power cylinder into separate chambers each of which is connected to a rotary power steering valve by an external fluid line. By the selective supply and exhaust of pressure fluid from the power cylinder chambers power assistance to the pinion drive of the rack is provided to reduce steering effort. In this prior arrangement a pair of tie rods is secured to an end portion of the rack and centrally between the power cylinder and the rack and pinion steering gear. While this prior arrangement is satisfactory for some vehicle applications, it requires considerable axial space and two elongated external lines for the power cylinder and is thus not suitable for many vehicle installations where space is limited. Another prior rack and pinion steering gear employs a power cylinder concentric with a rack connected at each end to a tie rod. This arrangement has a hydraulic piston connected directly to the rack and cooperates with a pair of spaced glands through which the rack is slidable to provide separate hydraulic fluid chambers. This arrangement requires a rack of extended length to provide sufficient space for the rack teeth which cannot be moved into the gland without seal damage and loss of power steering. This prior power-assisted rack and pinion steering gear also requires excessive space and is not satisfactory for many vehicle applications where space is limited. Also prior to this invention rack and pinion steering gear arrangements have incorporated boot seals which are pneumatically connected by an external line that transfers the air from one boot seal to the other in response to vehicle steering causing collapse of either one of the boot seals. This air transfer provision increases the cost of the steering gear unit since it involves special boot seal construction and requires an auxiliary tube interconnecting the boot seals.

This invention generally provides a power assisted rack and pinion steering gear assembly which has a shorter length as compared to prior steering gear assemblies and is thus suitable for a wide range of vehicle environments and is particularly suitable for economy type vehicles where space is limited. The steering gear assembly of this assembly incorporates a hydraulically operated power cylinder concentrically disposed with respect to an internal rack support tube that has a toothed pinion-driven rack slidably mounted therein. The power cylinder has a piston therein which is slidably supported on the rack support tube and which cooperates with spaced fluid sealing construction to provide separate chambers that are selectively fed with pressure fluid and exhausted by operation of a rotary steering valve to effect movement of the piston. The piston extends axially from the power cylinder and is connected with a tie rod support preferably located near the central axis of a vehicle. This tie rod support is also connected to the end of the rack and supports a pair of tie rods connected thereto which are drivingly connected to the dirigible wheels of the vehicle. The rack extends axially through the housing of the steering valve. A first boot seal is connected between one end of the rack and the rotary valve housing is pneumatically connected by new and improved internal air passage means to a second boot seal extending from the other end of the rack and a collar supported on the end of the power cylinder. The pinion gear meshes with the rack teeth and is rotated by a pinion gear driven by an input shaft that also actuates the rotary valve. The rotary valve is hydraulically connected to the first chamber by an external line and to the second chamber by an internal fluid passage.

More specifically another feature, object and advantage of this invention is to provide a new and improved power assisted rack and pinion steering gear assembly in which the piston of a power cylinder and the teeth of the rack are independent in location to permit a shortened steering gear assembly.

Another feature, object and advantage of this invention is to provide an improved mounting for the power cylinder of a rack and pinion steering gear unit which permits the toothed portion of the rack to extend through the sealed portion of the power cylinder so that the length of the unit is minimized.

Another feature, object and advantage of this invention is to provide a new and improved power assisted rack and pinion steering gear unit having a tie rod connector secured to the inner end of the unit for connection with a pair of tie rods operatively connected to the dirigible wheels of a vehicle.

Another feature, object and advantage of this invention is to provide a new and improved power assisted rack and pinion steering gear unit having spaced flexible boot seals disposed over each end of the rack and pneumatically interconnected by an internal passage in the unit including a piston rod component of a hydraulically operated power cylinder.

Another feature, object and advantage of this invention is to provide a new and improved power assisted rack and pinion steering gear having a hydraulically operated power cylinder disposed around the rack operatively connected to a control valve by an external passage connected to one side of a piston in the power cylinder and by internal passage means in the control valve housing connected to the other side of the piston.

These and other objects, features and advantages of this invention will become more apparent from the following detailed description and drawings in which:

FIG. 1 is a perspective view of a steering gear assembly, tie rods and dirigible wheels of a vehicle;

FIG. 2 is a front view partly in cross section of the steering gear assembly of FIG. 1 illustrating a preferred embodiment of this invention;

FIG. 3 is an enlarged view of a portion of the steering gear assembly of FIG. 2.

Turning now in greater detail to the drawings, there is shown in FIG. 1 a rack and pinion steering gear assembly 10 operatively connected to a pair of dirigible vehicle wheels 12 by tie rods 14 and steering arms 16. The steering gear assembly 10 has a conventional rotary valve 18 that is actuated by an input shaft 20 adapted to be turned in clockwise and counterclockwise direction by a steering wheel not shown. The input shaft 20 is drivingly connected to a pinion gear 24 which meshes with the teeth 26 of a laterally extending rack 28. Rotation of the pinion gear 24 by the shaft 20 will cause lateral movement of the rack in response to either clockwise or counterclockwise rotation of the pinion gear to effect vehicle steering. As shown, the rack 28 is drivingly connected to an annular end portion of a tie rod connector 30 by a locking pin 32. The tie rod connector has side-by-side openings 34 and 36 for the left and right tie rods 14 operatively connected to the steering arms 16 of the left and right dirigible road wheels 12 of a vehicle.

The rack is mounted for sliding movement in a rack support tube 40 secured to one end in the housing 42 of the rotary valve 18. A power cylinder 44 is employed to power assist rack movement in response to rotation of the input shaft 20. The power cylinder has a cylindrical tube 46 concentrically disposed with respect to the rack support tube 40, supported at one end by the rotary valve housing 42. An annular fluid seal 47 disposed between tube 40 and valve housing 42 seals one end of the power cylinder 44. As shown best in FIG. 2 the teeth 26 of the rack extend through the plane of this seal. This cylindrical tube 46 extends axially into a collar 48 spaced from the valve 18. The collar 48 has a fluid port 50 which receives a threaded fitting 52 that connects port 50 to a hydraulic line 54 extending into the rotary valve 18. A connector 56 with a fluid feed passage therethrough is seated in port 50 and has a conical head that fits in the end of the fluid passage and fitting 52. The connector 56 hydraulically connects fitting 52 with a fluid passage 58 formed in a bearing 60 disposed inwardly of collar 48. Bearing 60 slidably supports a cylindrical piston rod 62 that is connected to a piston 64 mounted between the cylindrical tube 46 of the power cylinder and the rack support tube 40. The piston rod 62 extends axially from the piston 64 through a fluid seal 65 and out of end cap 66 secured in collar 48 by a snap ring 68. The outer end of piston rod 62 extends radially inward and is clamped between a counterbored shoulder of tie rod connector 30 and washer 70 seated on shoulder of rack 28 by locking pin 32 and is thus secured to the rack.

The piston 64 cooperates the cylindrical tube of the power cylinder to form separate fluid chambers 72 and 74. Chamber 72 is hydraulically connected to the rotary valve by passage 58, connector 56 and external line 54. Chamber 74 is connected to the rotary valve by an internal passage 76 formed in the housing 42 of the valve. Valve 18 is activated by input shaft 20 to selectively feed and exhaust chambers 72 and 74. When chamber 74 is supplied with fluid and chamber 72 is exhausted, the rack 28 moves to the left in viewing FIGS. 1 and 2 and towards the center of the vehicle. This leftward movement is limited by a ring-like bumper 80 of elastomeric material when in contacting a shoulder 82 formed on the housing 42 of rotary valve 18. A similar bumper 84 supported on the end of piston rod 62 and located against the inner end of the tie rod connector 30 is adapted to contact end cap 66 to limit movement of the rack 28 to the right in viewing FIGS. 1 and 2 in response to pressurization of chamber 72 and exhaust of chamber 74.

A pair of boot seals 86 and 88 are employed over the ends of the rack as shown in FIGS. 1 and 2 to prevent entry of water, dirt and other foreign materials into the steering assembly. The inboard boot seal 86 has one end fastened to collar 48 by a fastener clip 90 and the other end secured to the annular end of tie rod connector 30 by a fastener clip 92. In a similar manner, the outer boot seal 88 is fastened to the valve housing 42 by a fastener clip 94 and to the end of the rack by a fastener clip 96. The boot seals 86 and 88 are pneumatically connected by a hole 98 in the end of the piston rod 62 adjacent to bumper 84 and by the clearance between the rack 28 and the rack support tube 40 as provided by the rack teeth 26 and the flat 100 extending axially along the rack from the rack teeth toward the end of the rack.

In operation left and right steering is accomplished by appropriately turning the input shaft 20 in a selective direction of rotation to accordingly rotate the pinion 24. The pinion when rotated will move the rack linearly to turn steering arms and the attached steerable wheels 12 in the selected direction. Rack movement is power assisted by the operation of the rotary valve 18 that directs pressure from a power steering pump not shown to the steering gear assembly. For right turns the valve 18 is actuated so that pressure is admitted into chamber 72 through passage 54 while fluid pressure is exhausted from chamber 74 through passage 76. The piston 64 moves toward the valve 18 until the turning of the input shaft is completed. When this occurs, the valve 18 supplies chambers 72 and 74 with equalized pressure to stabilize the piston 64 in its adjusted position. Since the piston is connected to one end of the rack by the piston rod the rack movement will be power assisted.

Power assisted left turn steering is accomplished by rotating input shaft 20 in a counterclockwise direction to turn the pinion to axially move the rack away from valve 18 to turn steering arm 16 and steerable wheels to the left. As input shaft 20 is turned, pressure is supplied to chamber 74 as chamber 72 is exhausted. This causes piston 64 to be moved toward the center of the vehicle to provide power assistance for the pinion drive of the rack. As in the right turn operation the pressure in chamber 72 and 74 is equalized by the valve 18 in response to the termination of rotation of the input shaft 18 so that the piston is stabilized at the adjusted position.

Assuming that the rack is moved linearly in an outboard direction to provide for right turn steering, the boot seal 86 will be mechanically collapsed and air from this boot seal is transferred from boot seal 86 through the hole 98 and the internal passage provided between the rack and the rack support into the boot seal 88. When the boot seal 88 is being collapsed on the execution of a left turn, air will be forced from boot seal 88 into the boot seal 86 via the passages just described. If the rack is moved in an inboard direction to its furthest extent, the bumper 80 will contact the end 82 of the valve housing 42. This bumper cushions the engagement of the rack and the valve housing to limit further rack movement so that the pinion gear and other components of the assembly will not be damaged. In a similar manner bumper 84 contacts the end cap 66 to cushion and limit the travel of the rack to the right to prevent damage to the pinion and other components of the assembly.

The power assisted rack and pinion steering gear described above is substantially shorter in length than the prior art powered rack and pinion steering gear with the advantageous use of the tubular rack support that is concentric with the piston rod and the power cylinder. Since the rack teeth pass through the rack support tube and through a central opening in the piston a long rack such as used in many prior art steering gears is not required. By having the power cylinder concentric with the rack support tube the rack and the piston rod the prior art power cylinder axially mounted with respect to racks is eliminated. With this invention, the tie rod connector is located at one end of the assembly at the center of the vehicle which permits the use of long tie rods particularly suitable for use with independent wheel suspensions such as disclosed in British Pat. No. 1,037,760 and used on many economy type vehicles.

While a preferred embodiment of this invention has been described to illustrate the principles of this invention, other embodiments will now become apparent to those skilled in the art. Accordingly, this invention is not limited to the specific structure shown and described for illustrating the invention, but is set forth in the following claims.

We claim:

1. A power assisted rack and steering gear assembly comprising an elongated and toothed rack, a tubular support member supporting said rack for axial movement therein, first and second flexible seal means forming expansible and contractible chambers operatively connected to opposite ends of steering gear assembly and pneumatically communicating with each other through said tubular support member, said rack having opposite end portions extending outwardly from opposite ends of said tubular support member into said flexible seal means, a pinion gear meshing with the teeth of said rack, rotatable drive means drivingly connected to said pinion gear for moving said rack axially, a fluid actuated power cylinder for power assisting movement of said rack, said power cylinder comprising a cylindrical housing disposed around a portion of said tubular support member, a piston slidably mounted in said power cylinder and on said support tube dividing said power cylinder into separate fluid chambers, piston rod means drivingly connecting said piston to an end portion of said rack, fluid control valve means operatively connected to said power cylinder for supplying pressure fluid to and exhausting fluid from each of said separate fluid chambers in response to predetermined rotation of said drive means, first fluid passage means operatively connecting said first fluid chamber to said valve means and second fluid passage means operatively connected to said second chamber and fluid control valve means, and tie rod connector means connected to one end of said piston rod means and said rack.

2. A power assisted rack and pinion steering gear comprising a pinion gear, an elongated rack bar having rack teeth extending a predetermined distance along said rack bar for meshing engagement with said pinion gear, a support tube disposed around said rack bar between the ends thereof for supporting said rack bar for sliding movement therein, an opening in the wall of said tube, said pinion gear engaging said rack bar through said opening, hydraulic valve means having a housing supporting said pinion gear and said rack support tube, a power cylinder extending from said housing disposed around said rack support tube, a support collar axially spaced from said housing closing one end of said power cylinder, a piston slidably mounted in said power cylinder and having an inner seal engaged with said support tube and an outer seal engaged with said cylinder, a piston rod connected to said piston and extending axially in one direction beyond the end of said support collar and terminally in an end portion, means drivingly connecting said end portion to an end portion of said rack bar, first sealing means mounted in said collar at the inner end of said support tube and cooperating with said piston rod to form a first chamber, second sealing means disposed between said housing and said rack support tube and located radially outwardly with respect to predetermined toothed portion of said rack to form a second chamber, fluid passage means operatively connecting said hydraulic valve means to said first and second chambers for selectively supplying fluid pressure to the first or second chamber to activate said piston to power assist movement of said rack by said pinion.

3. A power assisted rack and pinion steering gear for steering first and second laterally spaced dirigible wheels of a vehicle comprising a pinion gear, an elongated rack having rack teeth for meshing engagement with said pinion gear, a support tube concentric with said rack for supporting said rack for sliding movement therein, a housing, means mounting said support tube in said housing, a power cylinder extending from said housing disposed around said support tube, a collar axially spaced from said housing closing one end of said power cylinder, a piston mounted in said power cylinder slidably mounted on said support tube dividing said power cylinder into first and second fluid chambers, a piston rod connected to said piston extending axially beyond the end of said power cylinder, tie rod connector means secured to the end of said piston rod to one end of said rack, a first flexible boot seal means connected to said tie rod connector means and to said collar to form a first pneumatic chamber, second flexible boot seal means connected to said housing and to the other end of said rack to form a second pneumatic chamber, and fluid passage means extending through said piston rod and between said rack and said support tube to pneumatically connect said pneumatic chambers to each other so that fluid can be transmitted from one of said chambers to the other of said chambers in response to predetermined linear movement of said rack.

* * * * *

UNITED STATES PATENT AND TRADEMARK OFFICE
CERTIFICATE OF CORRECTION

PATENT NO. : 3,951,045
DATED : April 20, 1976
INVENTOR(S) : William R. Frei, et al It is certified that error appears in the above—identified patent and that said Letters Patent are hereby corrected as shown below:

Column 3, line 13, "to" should be -- at --.

Column 6, line 43, -- and -- should be inserted after "rod".

Signed and Sealed this

Twentieth Day of July 1976

[SEAL]

Attest:

RUTH C. MASON
*Attesting Officer*

C. MARSHALL DANN
*Commissioner of Patents and Trademarks*